United States Patent [19]

Landmeier

[11] Patent Number: 5,714,720
[45] Date of Patent: Feb. 3, 1998

[54] HIGH EFFICIENCY PASSIVE POINTER DIGITIZER SYSTEM

[75] Inventor: Waldo L. Landmeier, Phoenix, Ariz.

[73] Assignee: CalComp Inc., Anaheim, Calif.

[21] Appl. No.: 503,409

[22] Filed: Jul. 15, 1995

Related U.S. Application Data

[63] Continuation of Ser. No. 306,289, Sep. 15, 1994, abandoned.

[51] Int. Cl.$^6$ ............................................... G08C 21/00
[52] U.S. Cl. ............................................................. 178/19
[58] Field of Search ..................................... 178/19, 18, 20

[56] References Cited

U.S. PATENT DOCUMENTS

| | | | |
|---|---|---|---|
| Re. 33,740 | 11/1991 | Taguchi | 178/19 |
| Re. 33,805 | 1/1992 | Yamanami | 178/19 |
| Re. 33,936 | 5/1992 | Miyamori | 178/18 |
| Re. 34,187 | 3/1993 | Yamanami | 178/19 |
| 4,609,776 | 9/1986 | Murakami | 178/18 |
| 4,617,515 | 10/1986 | Taguchi | 324/207 |
| 4,631,356 | 12/1986 | Taguchi | 178/19 |
| 4,634,973 | 1/1987 | Murakami | 324/207 |
| 4,658,373 | 4/1987 | Murakami | 364/559 |
| 4,678,870 | 7/1987 | Taguchi | 178/19 |
| 4,697,244 | 9/1987 | Murakami | 364/520 |
| 4,709,209 | 11/1987 | Murakami | 324/207 |
| 4,832,144 | 5/1989 | Murakami | 178/18 |
| 4,845,478 | 7/1989 | Taguchi | 340/712 |
| 4,848,496 | 7/1989 | Murakami | 178/19 |
| 4,878,553 | 11/1989 | Yamanami | 178/18 |
| 4,890,096 | 12/1989 | Taguchi | 340/712 |
| 4,948,926 | 8/1990 | Murakami | 178/19 |
| 4,956,526 | 9/1990 | Murakami | 178/18 |
| 4,988,837 | 1/1991 | Murakami | 178/18 |
| 4,999,461 | 3/1991 | Murakami | 178/19 |
| 5,023,408 | 6/1991 | Murakami | 178/19 |
| 5,028,745 | 7/1991 | Yamanami et al. | 178/19 |
| 5,045,645 | 9/1991 | Hoendervoogt et al. | 178/19 |
| 5,059,749 | 10/1991 | Murakami | 178/19 |
| 5,128,499 | 7/1992 | Morita | 178/19 |
| 5,130,500 | 7/1992 | Murakami | 178/19 |
| 5,134,388 | 7/1992 | Murakami | 340/706 |
| 5,134,689 | 7/1992 | Murakami | 395/143 |
| 5,198,623 | 3/1993 | Landmeier | 178/19 |
| 5,206,785 | 4/1993 | Hukashima | 361/283 |
| 5,210,380 | 5/1993 | McDermott et al. | 178/19 |

*Primary Examiner*—Stephen Chin
*Assistant Examiner*—Kevin Kim
*Attorney, Agent, or Firm*—Frederic P. Smith; William F. Porter, Jr.

[57] ABSTRACT

A high efficiency passive pointer digitizer system comprising first and second sets of orthogonal and substantially coplanar conductors, a signal generator for generating a driving signal selectively along the first set of conductors, a movable pointer inductively coupled to the first and second sets of conductors, the pointer including a tuned circuit responsive to the driving signal for radiating a positional signal, a signal detector for detecting a positional signal induced in the second set of conductors by the tuned circuit responding to the driving signal, and a signal processor coupled to the signal generator and the signal detector for determining the location of the pointer relative to the conductors.

3 Claims, 2 Drawing Sheets

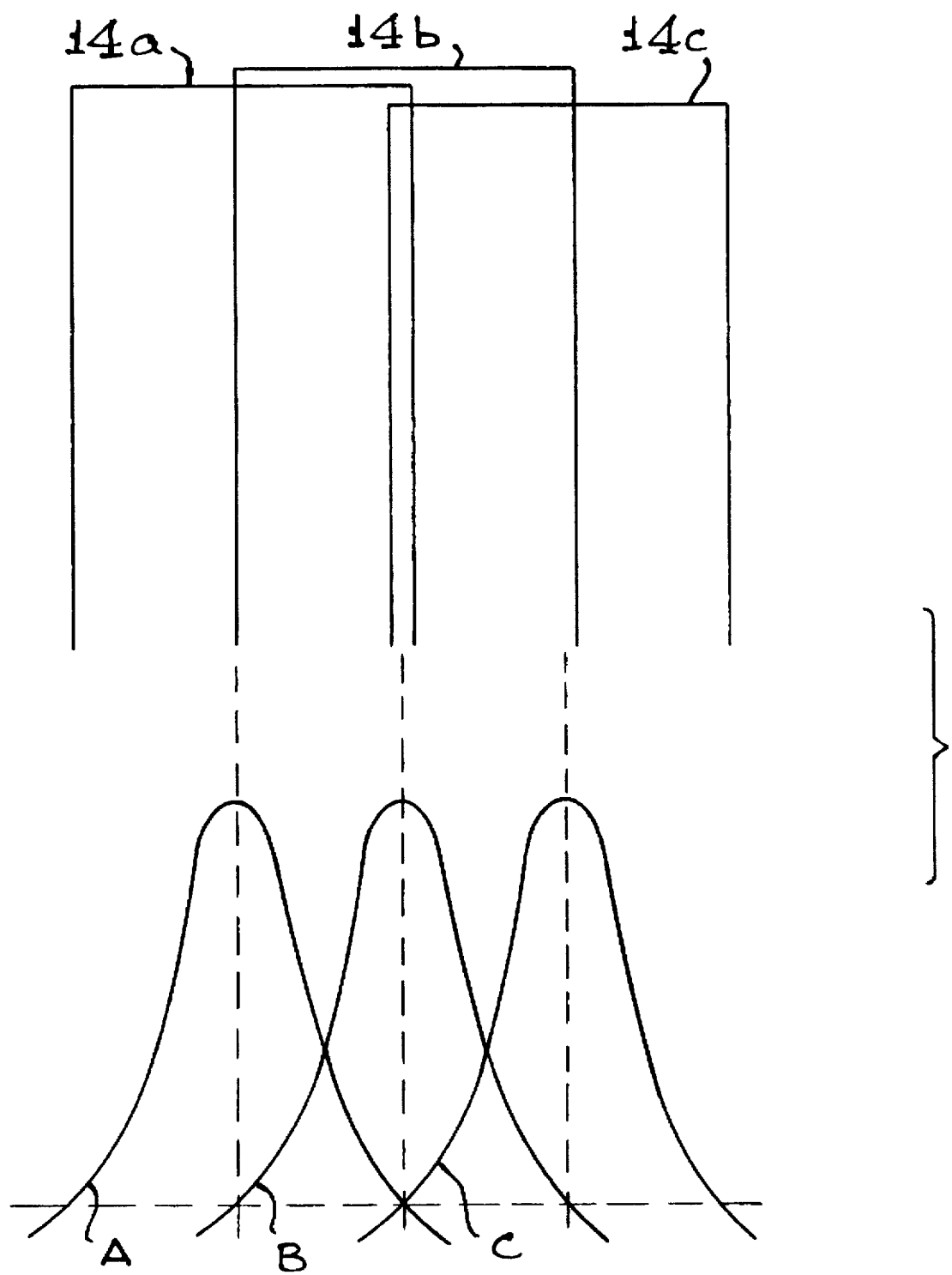

HIGH EFFICIENCY PASSIVE POINTER DIGITIZER SYSTEM

This is a continuation of application Ser. No. 08/306,289 filed on Sep. 15, 1994 abandoned.

BACKGROUND OF THE INVENTION

1. Field of the Invention

This invention relates to the field of graphic digitizer systems and, in particular, to a highly efficient graphic digitizer system which utilizes a passive pointer.

2. Description of Related Art

Graphic digitizer systems are used in the art for translating the position of a point on a plan or drawing into coordinates recognizable by a computer. A number of well known graphic digitizer systems make use of a movable coil and a work surface defined by one or more receiving grids of conductors. The coil may be disposed within the tip of a pen-shaped instrument and an oscillator is provided which supplies an ac driving signal of predetermined frequency and magnitude to the coil, which is inductively coupled to the conductors of the grid. In accordance with well known principles of electromagnetic theory, ac signals are induced in the grid conductors at a magnitude and phase that depend on-the location of the coil relative to the conductors. Generally, the signals induced in the conductors will have a magnitude that varies from zero at the coil center to a maximum at the periphery and tapering off beyond. Furthermore, the phase of the signals induced in the conductors at one side of the coil will be the opposite of (180 degrees displaced from) that of signals induced in the conductors at the other side.

While in previous systems the movable coil was powered by a cable connecting the oscillator and the ac driving signal to the coil, or an ac oscillator was located in the pointer together with a battery for power, recent systems have utilized the grid itself as a transmitting antenna by applying the ac driving signal to the grid and having a tuned circuit in a pen-shaped pointer which receives the ac power signal and then acts as a transmitter to induce ac positional signals in the grid, whose conductors are accessed through the use of multiplexer circuitry to couple the induced signals to detection circuitry to locate the pointer. Such a so-called passive pointer digitizer system is disclosed in U.S. Pat. No. 4,878,553 issued Nov. 7, 1989 to Yamanami et al., entitled "Position Detecting Apparatus." This system, however, utilizes only the X conductors of the grid, or the X and the Y conductors of the separate grids sequentially, and requires that the ac driving signal be removed for a sufficient period of time from the X or Y conductors of the transmitting grids before the X or Y conductors of the receiving grids are accessed to enable confusing clutter and transients to subside and to enable the ac driving signal to sufficiently decay so as not to be detected by the X conductors, or the Y conductors, of the receiving grid. This results in a 50% or less duty cycle for receiving energy from the pointer. While Yamanami discloses a prior system that uses orthogonal driving lines and detecting lines and a pointer having a magnetic member such as a ferrite (which focuses energy supplied to it and transfers it to the detecting lines), and successively supplies the driving lines with electric current and accesses the detecting lines sequentially, Yamanami rejects the use of such a system, citing numerous problems arising in its operation. Yamanami does not describe the system with sufficient detail to make use of its disclosure and apparently does not use any of the features of the system in his own disclosure.

To overcome the delay and duty cycle problem of Yamanami, a passive pointer digitizer system was conceived in which the movable pointer was powered by a remote ac driving signal applied to the driving grid, which signal consisted of a composite signal having first and second frequency components, the movable pointer having a first tuned circuit responsive to the first frequency component and a second tuned circuit coupled to the first tuned circuit and responsive to the second frequency component, the second tuned circuit inducing a positional signal having the second frequency component in the receiving grid to enable location of the movable pointer. Such a system is disclosed in U.S. Pat. No. 5,045,645, issued Sep. 3, 1991 to Hoendervoogt et al., entitled "Digitizer System with Passive Pointer". This system, however, has the disadvantages of being inefficient due to the transmission of a composite driving signal and the coupling of a second tuned circuit to the first tuned circuit to effect frequency conversion and of being more expensive due the complexity of such a system. Furthermore, such a system, in describing an embodiment which uses an X receiving grid overlayed on a Y receiving grid and a portion of the Y receiving grid as a driving grid to generate driving signals on the Y conductors which are then received as positional signals on the X conductors, requires the spacing between the separate planes containing the X grid and the Y grid to be expanded from the usual 0.003 to 0.004 inches to 0.025 to 0.030 inches to limit undesirable coupling between the grids.

Thus, it is a primary object of the present invention to provide an improved passive pointer digitizer system.

It is another object of the present invention to provide an improved passive pointer digitizer system that is highly efficient.

It is a further object of the present invention to provide an improved passive pointer digitizer system which uses a full-time driving signal and has a 100% receive time.

It is still another object of the present invention to provide an improved passive pointer digitizer system which uses only a single frequency transmit and receive system and thus does not incur the inefficiency and expense of a dual frequency passive pointer digitizer system.

It is a further object of the present invention to provide an improved passive pointer digitizer system which does not require a substantial spacial separation between the planes of the driving and receiving grids.

SUMMARY OF THE INVENTION

A high efficiency passive pointer digitizer system is provided comprising first and second sets of orthogonal and substantially coplanar conductors, a signal generator for generating a driving signal selectively along the first set of conductors, a movable pointer inductively coupled to the first and second sets of conductors, the pointer including a tuned circuit responsive to the driving signal for radiating a positional signal, a signal detector for detecting a positional signal induced in the second set of conductors by the tuned circuit responding to the driving signal, and a signal processor coupled to the signal generator and the signal detector for determining the location of the pointer relative to the conductors.

The novel features which are believed to be characteristic of the invention, both as to its organization and method of operation, together with further objects and advantages thereof, will be better understood from the following description in connection with the accompanying drawings in which the presently preferred embodiment of the inven-

BRIEF DESCRIPTION OF THE DRAWINGS

FIG. 2 illustrates receive loops and the corresponding received signals generated by the pointer of the present invention.

DESCRIPTION OF THE PREFERRED EMBODIMENT

Figure 1:
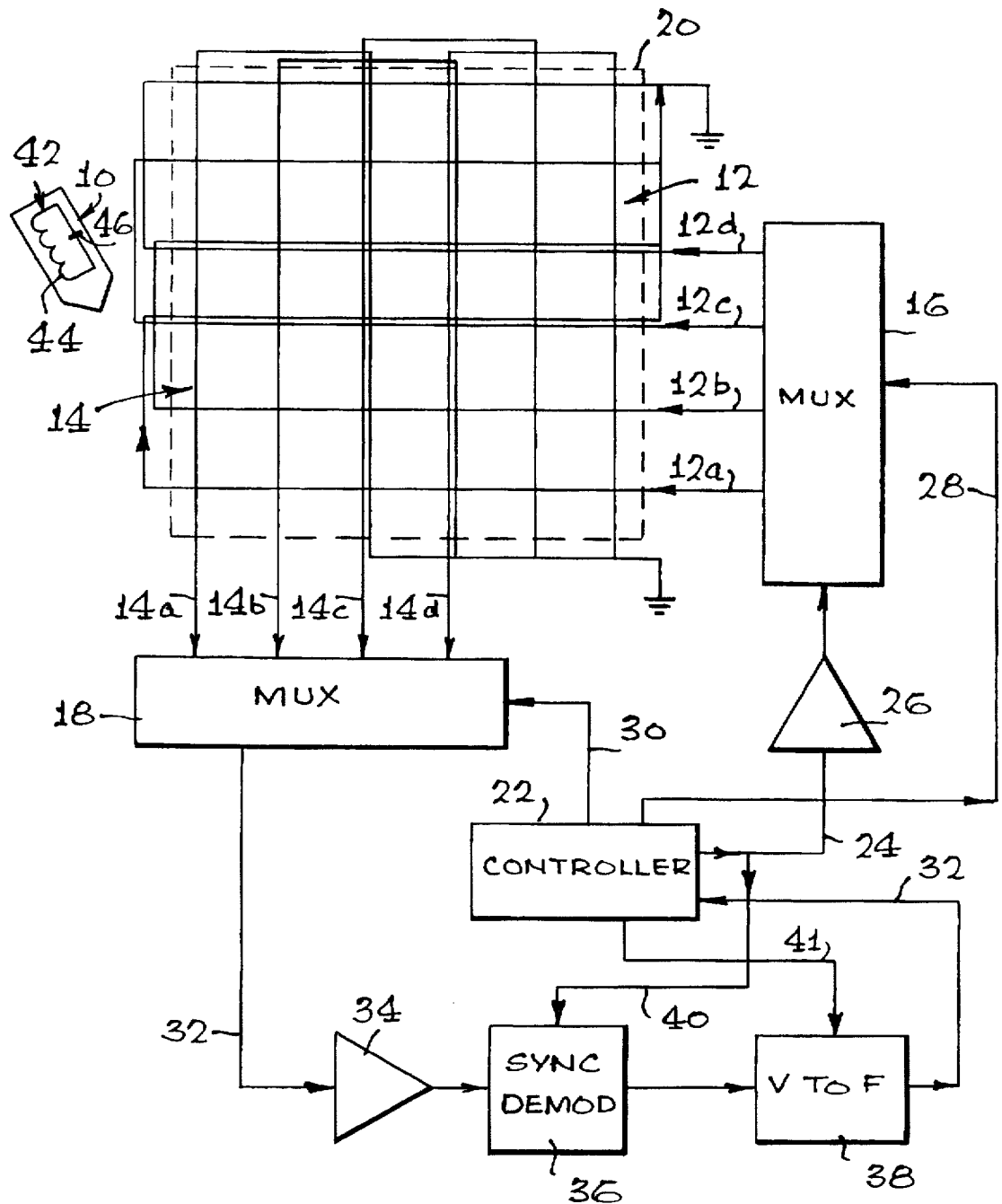
FIG. 1 is a block diagram illustrating the structure and operation of the present invention.

Referring now to FIG. 1, the structure and operation of the present invention is illustrated. A pointer 10 whose position is to be determined is shown placed adjacent to overlayed grids 12,14 of conductors 12a–d,14a–d. Each separate conductor has, for greater efficiency, one or more loops, with the separate conductors having overlapping loops. The loops may, if desired, have a plurality of turns. Grid 12 is used as the driving grid and is coupled to multiplexer 16. Grid 14 is used as the receiving grid and is coupled to multiplexer 18. The region of use of the overlayed grids 12,14 for the pointer 10 is designated by the dashed line 20 inside of which the conductors 12a–d are orthogonal to and substantially coplanar with conductors 14a–d and any portions of conductors 12a–d which are parallel to portions of conductors 14a–d are sufficiently spaced from one another so as to be decoupled. The digitizer system is controlled by controller 22, generally a microprocessor, which sends an ac driving signal along line 24 through amplifier 26 to multiplexer 16 and controls which of the particular conductors 12a–d of grid 12 receive the driving signal by means of an address signal along line 28. Controller 22 also controls by means of an address signal along line 30 coupled to multiplexer 18 which of the particular conductors 14a–d of receiving grid 14 passes a positional signal along line 32 to amplifier 34, synchronous demodulator 36, and voltage-to-frequency converter 38 to controller 22. Controller 22 also controls demodulator 36 and converter 38 along lines 40,41, respectively.

In operation then, in order to ascertain the position of pointer 10 adjacent to the grids 12,14, controller 22 generates an ac driving signal along line 24 and an address signal along line 28 so that the conductors 12a–d of the driving grid 12 selectively receive a driving signal. In a particular embodiment, the center drive conductor is initially energized as a transmit conductor. Pointer 10 is inductively coupled to the conductors 12a–d and includes therein a tuned circuit 42, represented by coil 44 and capacitor 46, which is tuned to receive the driving signal. The conductors 12a–d act as transmitting antennas and induce ac signals in tuned circuit 42. Since the pointer 10 is also inductively coupled to the conductors 14a–d of the receiving grid 14, the tuned circuit 44 acts as a transmitter to induce ac positional signals in the receive conductors 14a–d which are sequentially scanned by multiplexer 18 under control of an address signal along line 30. The sequentially scanned positional signals are coupled to synchronous demodulator 36 which converts each ac signal to a dc signal whose amplitude is proportional to the amplitude of the input ac signal and whose polarity corresponds to the phase of the input signal. The output of demodulator 36 is applied to converter 38 which converts the dc signal into a variable frequency signal, the frequency of which varies by a amount proportional to the magnitude of the dc signal and in a direction corresponding to its polarity. This signal is then coupled to controller 22 which processes the signal along with information regarding the address signal provided along line 30 to determine on which particular receive conductor 14a–d the strongest positional signal was generated followed by a signal of lesser amplitude. Such particular conductor 14a–d is then monitored and the controller 22 sequentially drives the transmit conductors 12a–d until a maximum receive signal is received on such particular conductor 14a–d followed by a signal of lesser amplitude, whereby the maximum transmit conductor is ascertained. The maximum transmit and receive conductors have now been ascertained and thus the coarse position of the pointer 10 with respect to the grids 12,14 is now known.

To determine the fine position of the pointer, three adjacent transmit and receive loops are looked at for each coarse position of the pointer. By determining the amplitude and phase of a received positional signal, positional ambiguities caused by loop symmetry can be removed. Such receive loops and the corresponding received signals are shown in FIG. 2. The particular maximum transmit conductor and its two adjacent conductors are energized and the amplitudes of the three transmitted signals are detected and are normalized to remove any variations due to variation in the distance of the pointer from the grids; the particular maximum receive conductor and its two adjacent conductors are then scanned and the amplitudes of the three received signals are detected and are also normalized. Normalization is accomplished by summing the signal amplitudes associated with the set of three conductors and using them as the denominator of the equation: $|A|+|A|+|B|+|C|$. By normalizing A, B, and C, a look-up table can be generated by moving a pointer across a conductor loop and recording the three normalized values into the look-up table. Position is then determined by recording the additional information of which loop the pointer is in and the look-up table number corresponding to the present normalized values of A, B, and C. Since a loop provides symmetrical data between the left and right halves of the loop, the loop half in which the pointer is can easily be determined by phase information. With the six normalized values obtained, three in X and three in Y, true position can be obtained using the look-up table. Tracking is accomplished by rapidly scanning three selected transmit and receive loops only and also by selecting and deselecting loops based on movement of the pointer. If the pointer is lifted and proximity is lost, coarse position will necessarily have to be reestablished. Since the conductors 14a–d within the region of use 20 are orthogonal to and substantially coplanar with the conductors 12a–d within the region of use 20, the ac signals generated by the conductors 12a–d do not directly generate any ac positional signals in the conductors 14a–d, only through the use of the pointer and its tuned circuit, and thus the driving signal can operate 100% of the time and a positional signal can be received and processed 100% of the time without the need of a dual frequency system.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

I claim:

1. A high efficiency passive pointer digitizer system comprising:

first and second sets of orthogonal conductors;

signal generating means for generating a driving signal selectively along said first set of conductors;

movable pointer means inductively coupled to said first and second sets of conductors, said pointer means including a tuned circuit responsive to said driving signal for radiating a positional signal;

signal detecting means for detecting a positional signal induced in said second set of conductors by said tuned circuit responding to said driving signal; and, signal processor means coupled to said signal generating means and said signal detecting means for determining the location of said pointer means relative to said conductors, said signal generating means including first multiplexer means to selectively generate a driving signal along said first set of conductors and said signal detecting means including second multiplexer means for sequentially scanning said positional signals induced on said second set of conductors and for coupling said positional signals to said signal processor means for determining the location of said pointer means relative to said second set of conductors, said signal processor means, upon determining the location of said pointer means relative to said second set of conductors by determining the particular conductor of said second set of conductors on which a positional signal of maximum amplitude is induced followed by an induced positional signal of lesser amplitude, causing said signal generating means and said first multiplexer means to generate a driving signal sequentially along said first set of conductors until a positional signal of maximum amplitude is received on said particular conductor of said second set of conductors followed by an induced positional signal of lesser magnitude, whereupon the particular conductor of said first set of conductors inducing said received positional signal of maximum amplitude is ascertained by said signal processor means and the location of said pointer means relative to said first set of conductors is determined.

2. The passive pointer digitizer system of claim 1 wherein the fine position of said pointer means is determined by using the amplitudes of the positional signals of maximum amplitude on said particular conductors and the amplitudes of the signals on the two adjacent conductors for each of said conductors.

3. The passive pointer digitizer system of claim 2 wherein said amplitudes are normalized to eliminate any variations in amplitude due to variations in the position of said pointer means relative to said conductors.

* * * * *

Disclaimer 5,714,720—Waldo L. Landmeier, Phoenix, Arizona. HIGH EFFICIENCY PASSIVE POINTER DIGITIZER SYSTEM. Patent dated Feb. 3, 1998. Disclaimer filed March 13, 1998, by the assignee, CalComp Inc.

Hereby enters this disclaimer to the entire term of said patent.
*(Official Gazette, June 2, 1998)*